United States Patent Office 3,347,217
Patented Oct. 17, 1967

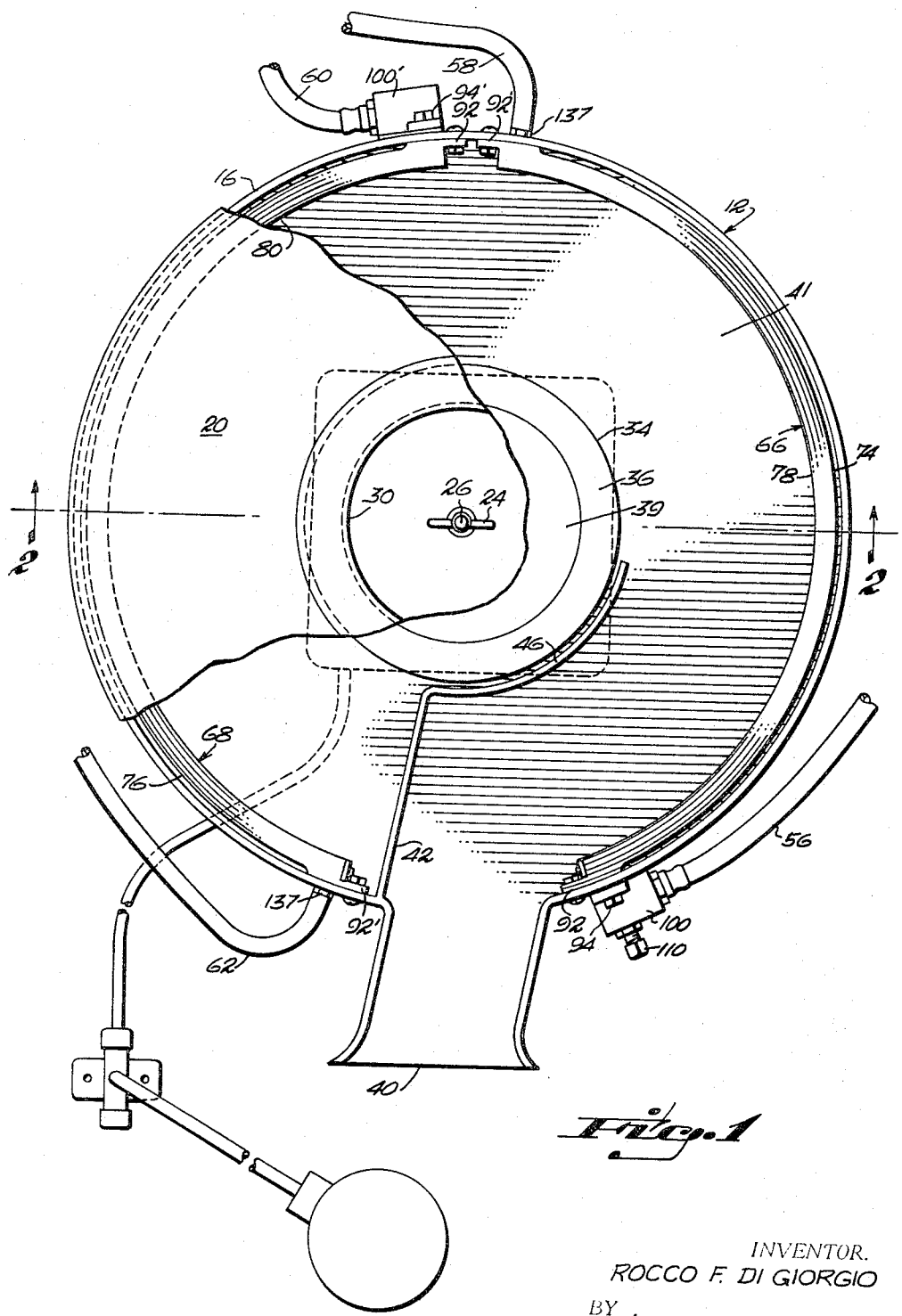

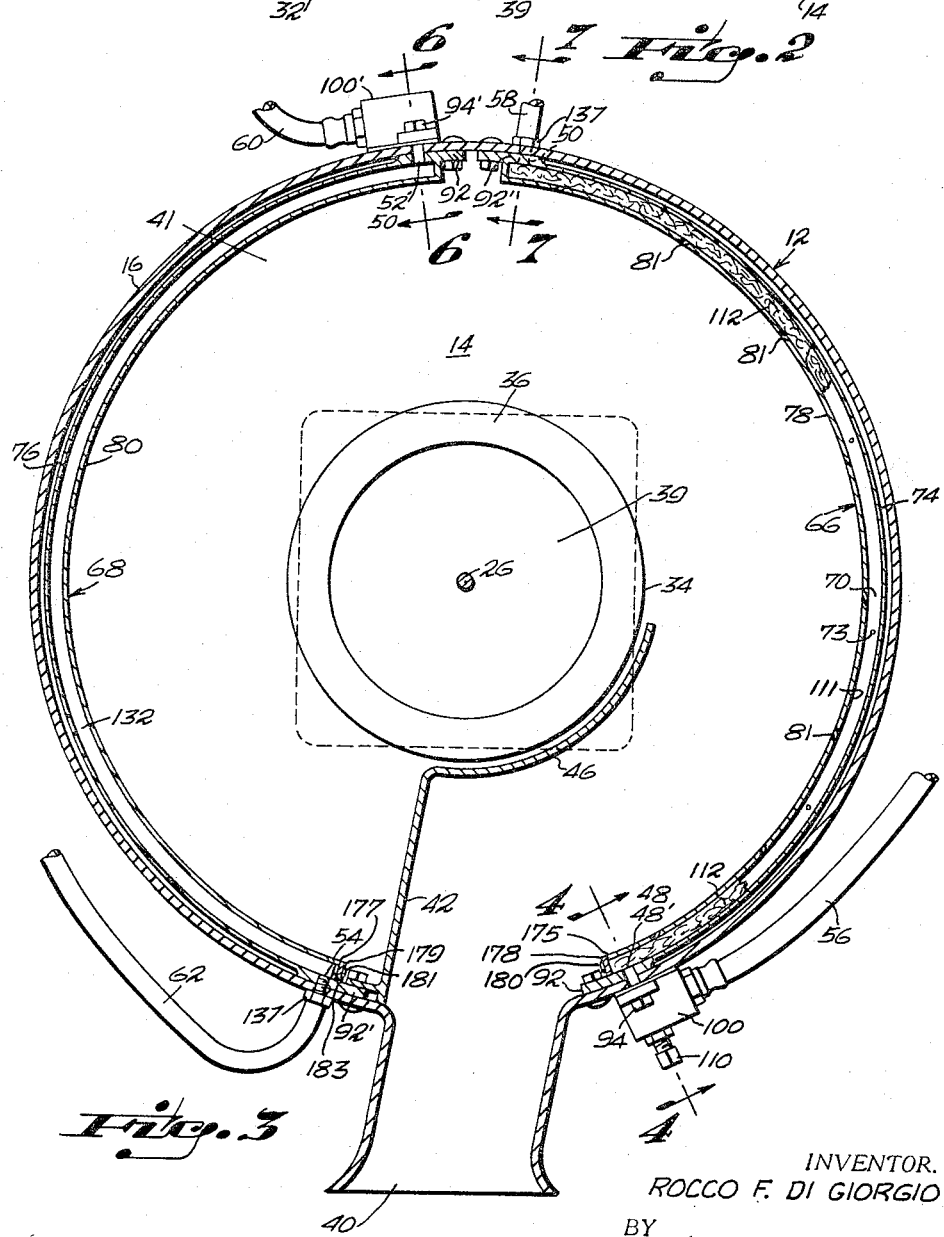

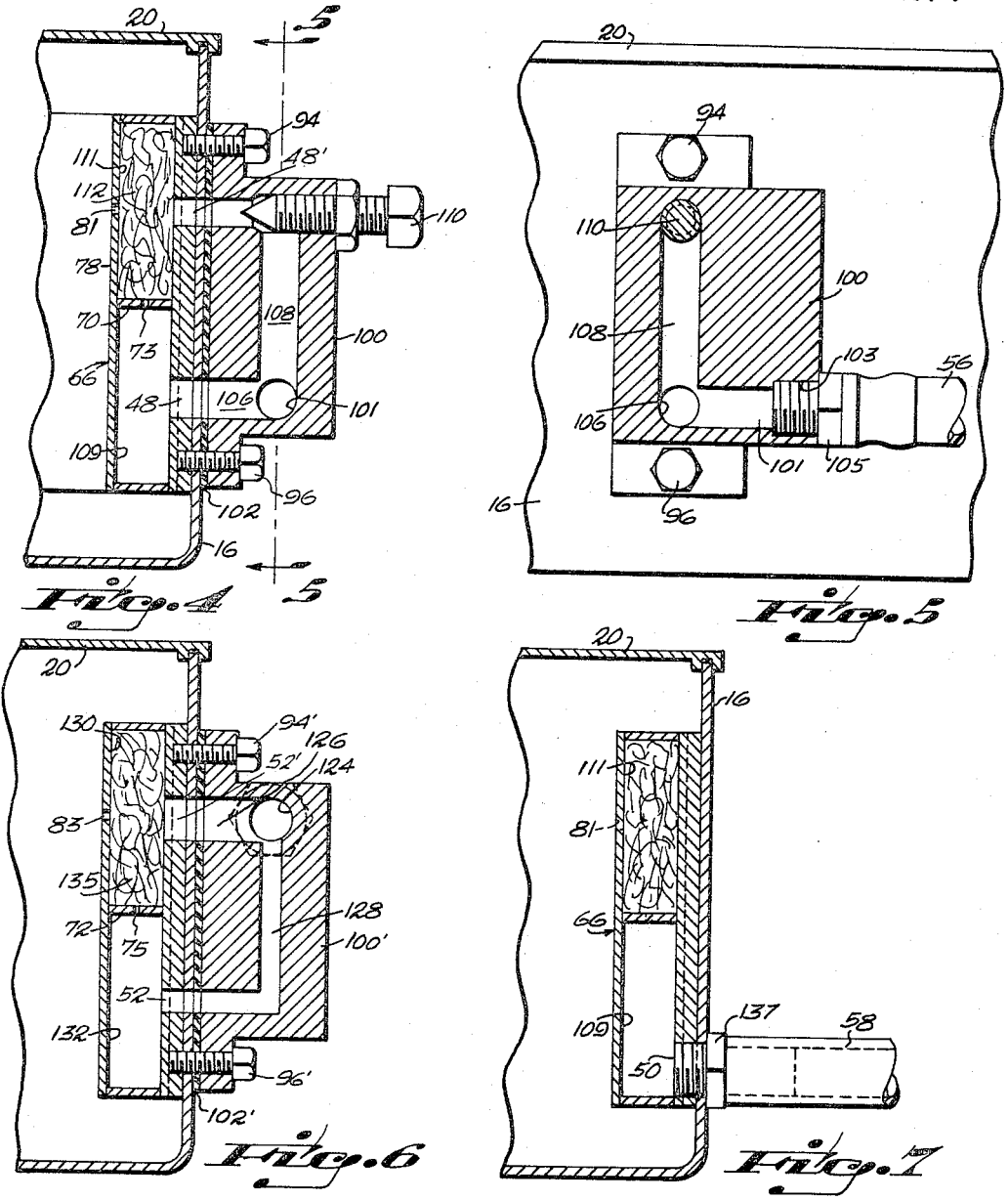
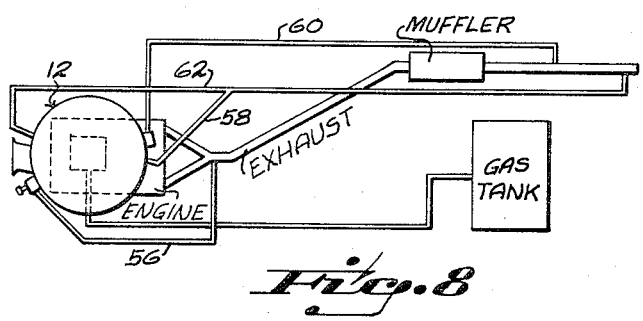

3,347,217
EXHAUST GAS PURIFIER DEVICE
Rocco F. Di Giorgio, 19401 NW. 24th Ave.,
Miami, Fla.
Filed Oct. 20, 1966, Ser. No. 588,047
9 Claims. (Cl. 123—119)

ABSTRACT OF THE DISCLOSURE

An exhaust gas purifier device to be installed intermediate an internal combustion engine and the exhaust system to recycle exhaust emissions to the carburetor for mixing and blending with an incoming air stream.

---

This invention relates to an exhaust gas purifier device adapted to be installed intermediate an internal combustion engine and the exhaust system to recycle exhaust emissions to the carburetor for mixing and blending with an incoming air stream.

It is an object of this invention to provide for attachment to the carburetor of a vehicle in a conventional air cleaner housing providing a path from an entrance throat to the carburetor throat and through a filtering medium, a jacket system to provide a flow through chamber for hot exhaust gases and which includes a plurality of openings in the jacket to flow some of the hot exhaust gases into the incoming air stream for merging and blending in the incoming air stream to be recirculated through the internal combustion engine.

It is another object of this invention to provide a housing of the type described in the preceding paragraph in which there is a first and a second jacket with each jacket being connected to pass therethrough a portion of the exhaust gases of the vehicle, with the portion passing through one of the jackets being taken from the exhaust manifold and the portion flowing through the other jacket being taken from a point on the exhaust side of the muffler, that, is the tailpipe section of the exhaust system of the vehicle.

It is another object of this invention to provide an exhaust gas purifier device as set forth in the following paragraphs which provides for the recycling of exhaust gas emissions and adjustment means for a predetermined selection of the ratio of exhaust gases to incoming air to the carburetor of a vehicle which provides for double filtering of the exhaust gases, first at an elevated temperature and second at a lower temperature, and which, in addition, provides for the removal of noxious elements in the form of condensate which is drained away and in the form of particulate or solid matter which is trapped in the filtering mediums.

It is another object of this invention to provide a device to purify the exhaust gas emissions which are to be circulated into and to mix, merge and blend with the incoming air of an air cleaner device for a carburetor and to preheat the incoming air.

It is another object of this invention to provide an exhaust gas purifier device which is inexpensive to manufacture, readily adapted to be installed to existing air cleaner devices of automobiles and other vehicles, and which is simple in construction and adapted to be readily adjusted for the range of vehicles commonly encountered with auto mechanics.

In accordance with these and other objects which will become apparent hereinafter, the instant invention will now be described with reference to the accompanying drawings in which:

FIGURE 1 is a top plan view of the instant device with the roof partly broken away to illustrate the interior portion thereof;

FIGURE 2 is a view in cross section taken along the plane indicated by the line 2—2 of FIGURE 1 and looking in the direction of the arrows;

FIGURE 3 is a plan view taken along the planes indicated by the staggered line 3—3 of FIGURE 2 and looking in the direction of the arrows;

FIGURE 4 is a view in cross section taken along the plane indicated by the line 4—4 of FIGURE 3 and looking in the direction of the arrows;

FIGURE 5 is a view taken along the plane indicated by the line 5—5 of FIGURE 4 and looking in the direction of the arrows;

FIGURE 6 is a view similar to that of FIGURE 5 taken, however, along the plane indicated by the line 6—6 of FIGURE 3 and looking in the direction of the arrows;

FIGURE 7 is a view in cross section taken either along the plane indicated by the line 7—7 of FIGURE 3 and looking in the direction of the arrows or in a corresponding plane in a diametrically opposed position of the device shown in FIGURE 3; and FIGURE 8 is a schematic view to illustrate the relative location and arrangement of the instant device with respect to the exhaust system of an automobile or other vehicle upon which it is installed.

Referring to the drawings, wherein like reference characters designate like or corresponding parts throughout the different views, and referring particularly to FIGURE 1, the numeral 12 designates a housing having a floor 14 and integral upstanding walls 16. A central opening 18 is provided in the floor and sized to fit over the throat of a carburetor of a vehicle in fluid-tight relation. A cover or roof member 20 is removably secured over the side walls to define a main chamber 21 within the housing. The roof is secured by means of a wing nut 24 threadably engaged on a stem 26 passed through a central roof opening 28. As can be seen, the roof and floor are each provided with an anular indentation 30 and 32 to receive in nesting relation an annular conventional ring of filtering material 34 which may be held by confronting channel members 36 and 38 in ring form secured within the indentations, the said ring defining an inner and outer chamber portion on opposite sides 39 and 41. The housing is provided with an intake throat 40, and a deflector wall 42 extending between the floor and roof is arranged to span the distance from the side wall adjacent one side of the throat to a radially opposite connection substantially at the surface of the filter element 34, and, preferably, the deflector plate includes an arcuate portion 46 to guide and encourage incoming air flow in the throat to a counter-clockwise path as the device is viewed in FIGURE 3. A plurality of secondary spaced ports are provided in the side wall of the housing, and include (a) a first set of openings, a pair of inlet openings 48 and 48' and an outlet opening 50, with the said inlet openings and outlet openings being accurately spaced from one another in the order of, but slightly less than, 180 degrees apart, and said inlet pair of openings 48 and 48' being one above the other and adjacent one side of the throat opening; and (b) a second set of openings, a pair of inlet openings 52 and 52' and an outlet opening 54 which are also spaced from one another in the order of approximately 180 degrees with the inlet pair of the second set being disposed adjacent the outlet port of the first set and with the outlet port 54 of the second set being on the other side of the throat and deflector plate 42 relative to the pair 48 and 48'. A plurality of connecting pipes or conduits connect the inlet opening 48 and 48' of the first set to the manifold by means of the tubing 56 and the outlet port 50 to the exhaust system by means of the tubing 58. Also, the tubing 60 connects the inlet pair of the second set to the exhaust system of the vehicle on the discharge side of the muffler thereof, and the tubing 62 is provided to connect the outlet port of the second set with the exhaust system, as is apparent from the schematic diagram of FIGURE 8. Closed annular jackets 66 and 68, preferably of oblong cross-section and each of a height substantially greater than its width as seen in vertical cross-section, are provided to connect the inlet and outlet openings of each set and as can be seen in FIGURES 4 and 6, each jacket is provided with a septum or partition 70 and 72 respectively, which are provided with a plurality of weep holes such as 73 and 75 spaced therealong. The jackets are arranged within the housing and are of a slightly smaller radius of curvature than that of the housing as seen in plan so that their outer walls 74 and 76 of the jackets are radially spaced slightly from the housing; further, the inner walls 78 and 80 are provided with a plurality of radial holes 81 and 83 respectively, above the septum. The jackets 66 and 68, are held from the wall by spacer elements 92 and 92' which may be composed of thickened sections of the outermost walls 74 and 76 of the jackets. Also, to the exterior of the housing at the inlet pairs of each set there are secured, as by the screws 94 and 96, and 94' and 96', adapters or fittings 100 and 100' and gaskets 102 and 102'. Referring to the adapter or fitting 100, an inlet port hole is provided and is composed of a counter-sunk bore 101 to provide a seat 103 for a connector stem 105 to connect to the tubing 56 and flow hot exhaust gases into the adapter. From the bore 101, two passageways are provided 106 and 108, each of which connects respectively to the lower and upper portion 109 and 111 of the jacket 66, the lower portion being below the septum and the upper portion being above the septum. Also, an adjustable needle valve 110 is provided to adjustably close the passageway 108 and thereby restrict flow into the upper portion 111 and control the amount of flow through the aforesaid holes 81 on the inside face 78 of the jacket 66. Also, the upper chamber 111 is provided with a filtering medium, such as copper mesh 112, to filter exhaust gases flowing therethrough. Referring to FIGURE 6, the adapter 100' is also provided with an inlet port 124 which connects by means of a first and second passageway 126 and 128 to the upper and lower chambers 130 and 132 respectively of the jacket 68, the said upper chamber being fitted with a filtering mesh 135. Also, it will be noted that the cross-sectional area of the passageway connecting to the lower chamber 132 is of a smaller cross-sectional area than the passageway connecting to the upper chamber. Each of the lower portions of the jackets is provided with a connector sleeve or fitting 137 through which gases carried in the respective lower chambers may be exhausted to the exhaust system through the previously described tubing 58 and 62 in accordance with the diagram of FIGURE 8.

In operation, it will be seen that in the conventional manner air will be taken into the air cleaner through the throat 40, and thereafter, deflected into a counterclockwise path of swirl through the housing, by which it will travel past the first jacket 68 and thence past the second jacket 70 with a portion of the incoming air at all times after passage of the arcuate portion 46 of the deflector being free to pass through the filtering medium 34 and opening 18 of the floor. As the gases pass through the first 180 degrees of travel around the path provided in the housing, exhaust gases from the manifold are introduced thereinto through the holes 81 of the upper chamber, a portion of the first jacket in an adjustable amount, by reason of the needle valve 110. Also, a portion of these hot manifold gases will flow through the lower chamber of this jacket to the exhaust port and will be exhausted through the exhaust system and will, by reason of their presence, preheat the incoming air. The gases being actually introduced into the mainstream through the upper chamber of the jacket will be filtered by the filtering medium 112 in the upper portion 111 of the jacket and will actually be cooled somewhat with the consequent condensate being free to drip into the lower chamber through the weep holes. The adjustment of the needle valve 110 will be readily accommodated by manipulation of the screw 110 until the proper mixture of incoming gases has been achieved. With respect to the second jacket, the somewhat cooler exhaust gases from a point rearward of the muffler are introduced thereinto and, as can be seen in FIG. 6, a portion thereof is traveled through the filtering medium upper portion of the chamber 130 and a portion, somewhat smaller by reason of the reduced cross-sectional passageway 128 of the adapter connecting to the lower chamber, flows through the lower chamber. The filtered main portion flowing in the upper jacket portion 130 is introduced into the mainstream through the holes 83 and serves to further heat the incoming gases; also, the condensate caused by cooling of the exhaust gases drips to the lower chamber for discharge through the tube 62. The principal function of this device is to reduce air contamination of vehicle exhaust systems. The two arcuate jackets may be installed in the housing which may comprise a conventional air cleaner assembly. The interior sections or portions of the jackets recycle the exhaust emissions returning those portions thereof which are not passed through the series of holes 81 and 83 on the inner faces of the jackets through the copper tubing to the exhaust system. The cavities or interior portions of the upper jacket sections, by reason of the filtering means, which is preferably of copper mesh, collect any solid particulate matter while the lower sections collect condensate from the cooling gases and preheat the incoming air which is to be filtered by the filtering ring 34. The recycled exhaust gases passing into the outer chamber 41 of the housing intermix with the air drawn in through the housing throat for recycling through the combustion chamber. It is thus seen that the noxious elements of the exhaust of internal combustion engines are cooled with a portion of the condensate being drained harmlessly away and that portion which solidifies being filtered through two stages of filtration, a first stage of filtration at an elevated temperature in the upper portion of the jackets, and a second stage of filtration through the annular filter ring 34 after it has been substantially cooled by reason of the incoming swirling air. As the speed of the vehicle increases, the pressure in the jackets will also increase and the flow of exhaust gases will, therefore, progressively increase with a greater portion passing progressively depthwise in the jacket through the holes of the series. Preferably, the holes of the series are equi-spaced in a line midway of the height of the upper portion to distribute gases into the air stream.

As can be seen in FIGURE 3, at one end of each jacket, such as the ends designated 175 and 177, cover plates 178 and 179 are provided which are removably attached thereto by means of the screws 180 and 181 which are passed through upstanding tines such as that designated by the numeral 183 of the jacket floor. By reason of this structure, the end caps may be removed and the copper mesh withdrawn so that by means of air pressure the interior of the jackets may be cleaned.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. For use on an internal combustion engine including a carburetor, an exhaust system, a closed filter housing having a hole to be connected over the mouth of the carburetor, said housing including a roof, floor, an upstanding connecting wall with a main inlet throat, and an annular filter ring in the housing between the floor and roof and disposed around the hole to filter air passing through the carburetor, the improvement comprising; a purifier device for exhaust gases which includes, a jacket system in the housing in spaced relation from and parallel to the ring length and having spaced inlet and outlet openings, and tubing to connect each of the openings to spaced points in the exhaust system of the internal combustion engine to flow exhaust gases through the housing within the jacket to heat the air passing through the housing, spaced openings in the jacket system to meter a portion of the exhaust gases flowing in the jacket into the housing to be recycled through the carburetor, said jacket system including a closed tubular length spanned by a longitudinally extending septum to separate the jacket into a first and a second cavity, with said spaced openings being along the length of the jacket and communicating between the housing interior and said first cavity, and said openings communicating into both of said cavities and out of just said second cavity, and said jacket including a metering means to flow a predetermined ratio of gases flowing through the tubes into each of the cavities.

2. A device as set forth in claim 1 wherein said septum is provided with a plurality of weep holes therealong to permit passage of condensate of the exhaust system between the cavities and said first cavity is above said second cavity.

3. A device as set forth in claim 2 wherein said first cavity is packed with a filtering mesh.

4. A device as set forth in claim 3 wherein said jacket includes an end cap to permit of access into the first cavity to remove said mesh and clean the jacket.

5. A device as set forth in claim 1 wherein said jacket system includes a first and a second tubular length in antipodal relation within said housing with each said length being connected between points in the exhaust system, the inlet opening of the first length being at the throat and connected by the tubing to the manifold of an engine to which it is mounted, and the inlet opening of the second length being adjacent the outlet opening of the first length and being connected by said tubing to the exhaust system of a vehicle on the downstream side of the manifold, and said outlet openings being connected to the after portion of the exhaust system.

6. A device as set forth in claim 1 wherein said metering means comprises an adapter at the inlet openings of said system and a valve intermediate the tubing to selectively meter exhaust gases in a predetermined ratio of volume into the first and second cavities.

7. An air cleaner, heater and exhaust gas purifier for an internal combustion engine and carburetor thereof,
 a floor centrally apertured to fit the intake throat of the carburetor,
 side walls upstanding from said floor,
 a cover fitting the free edge of said side walls and forming a housing with said floor and walls, there being an opening in said side walls for intake of air,
 first and second radially-spaced walls in said housing and fixed with said side walls in spaced relation therewith to form a first chamber extending in one direction from a first point adjacent said opening, at one side thereof, to a second point substantially diametrically opposite said first point,
 a first pipe connection fitting fixed with said side walls at said first point and in communication with said first chamber for conducting exhaust gas into said first chamber from the exhaust manifold of the engine,
 third and fourth radially-spaced walls in said housing and fixed with said side walls in spaced relation therewith to form a second chamber extending in said direction from said second point to a third point adjacent said opening at the other side thereof, and
 a second pipe connection fitting fixed with said side walls adjacent said second point and in communication with said second chamber for conducting exhaust gas into said second chamber from the exhaust pipe system of the engine, there being apertures in said first and third walls to conduct exhaust gas flowing into said chambers, into said housing.

8. The device of claim 7,
 first and second partitions in said first and second chambers extending between the walls thereof and respectively dividing each chamber into upper and lower compartments,
 said first and second fittings being in communication each with both upper and lower compartments of its respective chamber, and,
 adjustable valve means incorporated in said first fitting to vary the rate of flow of exhaust gas to the upper compartment only of said first chamber.

9. The device of claim 8,
 gas filter means in both said upper compartments, to filter gas prior to passing through said apertures, there being holes in said partitions to permit flow of fluid therethrough,
 a third pipe connection fitting fixed with said side walls and in communication with said lower compartment of said first chamber, adjacent said second point,
 a fourth pipe connection fitting fixed with said side walls and in communication with said lower compartment of said second chamber, adjacent said third point, said third and fourth fitting being adapted for connection with the exhaust pipe system of the engine, and
 ring filter means in said housing and encompassing the central aperture in the floor thereof.

References Cited
UNITED STATES PATENTS

| | | | |
|---|---|---|---|
| 1,452,699 | 4/1923 | O'Neill. | |
| 2,105,433 | 1/1938 | Noble. | |
| 2,262,013 | 11/1941 | Lang. | |
| 2,781,032 | 2/1957 | Sebok et al. | 123—122 |
| 2,843,216 | 7/1958 | Powell | 55—259 X |
| 3,137,284 | 6/1964 | Hultgren | 123—119 |
| 3,146,768 | 9/1964 | Osborne | 123—119 |
| 3,170,447 | 2/1965 | Svoren et al. | 123—119 |
| 3,186,391 | 6/1965 | Kennedy | 123—119 |
| 3,263,402 | 8/1966 | Lindamood et al. | 55—350 X |
| 3,277,876 | 11/1966 | Abts | 123—119 |

FOREIGN PATENTS

| | | |
|---|---|---|
| 998,800 | 9/1951 | France. |
| 1,193,571 | 4/1959 | France. |

AL LAWRENCE SMITH, *Primary Examiner.*